United States Patent [19]
Jäckel et al.

[11] Patent Number: 4,782,933
[45] Date of Patent: Nov. 8, 1988

[54] APPARATUS FOR COMPENSATING FOR FLUCTUATIONS OF TORQUE BETWEEN COAXIAL FLYWHEELS IN A MOTOR VEHICLE

[75] Inventors: Johann Jäckel, Bühl; Rudolf Hönemann, Ottersweier, both of Fed. Rep. of Germany

[73] Assignee: Luk Lamellen ünd Kupplungsbau GmbH, Bühl, Fed. Rep. of Germany

[21] Appl. No.: 844,475

[22] Filed: Mar. 26, 1986

[30] Foreign Application Priority Data

Mar. 27, 1985 [DE] Fed. Rep. of Germany ....... 3511060

[51] Int. Cl.⁴ .............................................. F16D 13/18
[52] U.S. Cl. ............................ 192/70.18; 192/106.1; 192/106.2; 192/110 B
[58] Field of Search ............ 192/52, 70.17, 70.18, 192/70.27, 70.28, 106.1, 106.2, 110 R, 110 B; 384/474

[56] References Cited

U.S. PATENT DOCUMENTS

| | | | |
|---|---|---|---|
| 1,905,666 | 4/1933 | Wego | 384/474 |
| 3,817,362 | 6/1974 | Rist | 192/106.1 |
| 3,863,747 | 2/1975 | Werner et al. | 192/106.2 |
| 3,931,876 | 1/1976 | Beeskow et al. | 192/106.2 |
| 3,948,373 | 4/1976 | Wörner | 192/106.2 |
| 4,036,341 | 7/1977 | Beeskow et al. | 192/106.2 |
| 4,044,874 | 8/1977 | Worner | 192/106.2 |
| 4,274,524 | 6/1981 | Nakane | 192/48.3 |
| 4,471,863 | 9/1984 | Lech, Jr. | 192/106.2 |
| 4,557,362 | 12/1985 | Nagano | 192/106.2 |
| 4,571,098 | 2/1986 | Rudnik | 384/474 |
| 4,611,701 | 9/1986 | Friedmann | 192/110 B |
| 4,618,048 | 10/1986 | Kobayashi | 192/106.2 |

Primary Examiner—John E. Murtagh
Assistant Examiner—Andrew Joseph Rudy
Attorney, Agent, or Firm—Peter K. Kontler

[57] ABSTRACT

A damping assembly which is interposed between two coaxial flywheels in the power train between the crankshaft of the engine and the transmission of an automobile has a friction generating device which is operative within a certain range of angular movability of the flywheels relative to each other to enhance the versatility and damping characteristics and to render it possible to more accurately conform such damping characteristics to the circumstances under which the flywheels are put to use.

81 Claims, 9 Drawing Sheets

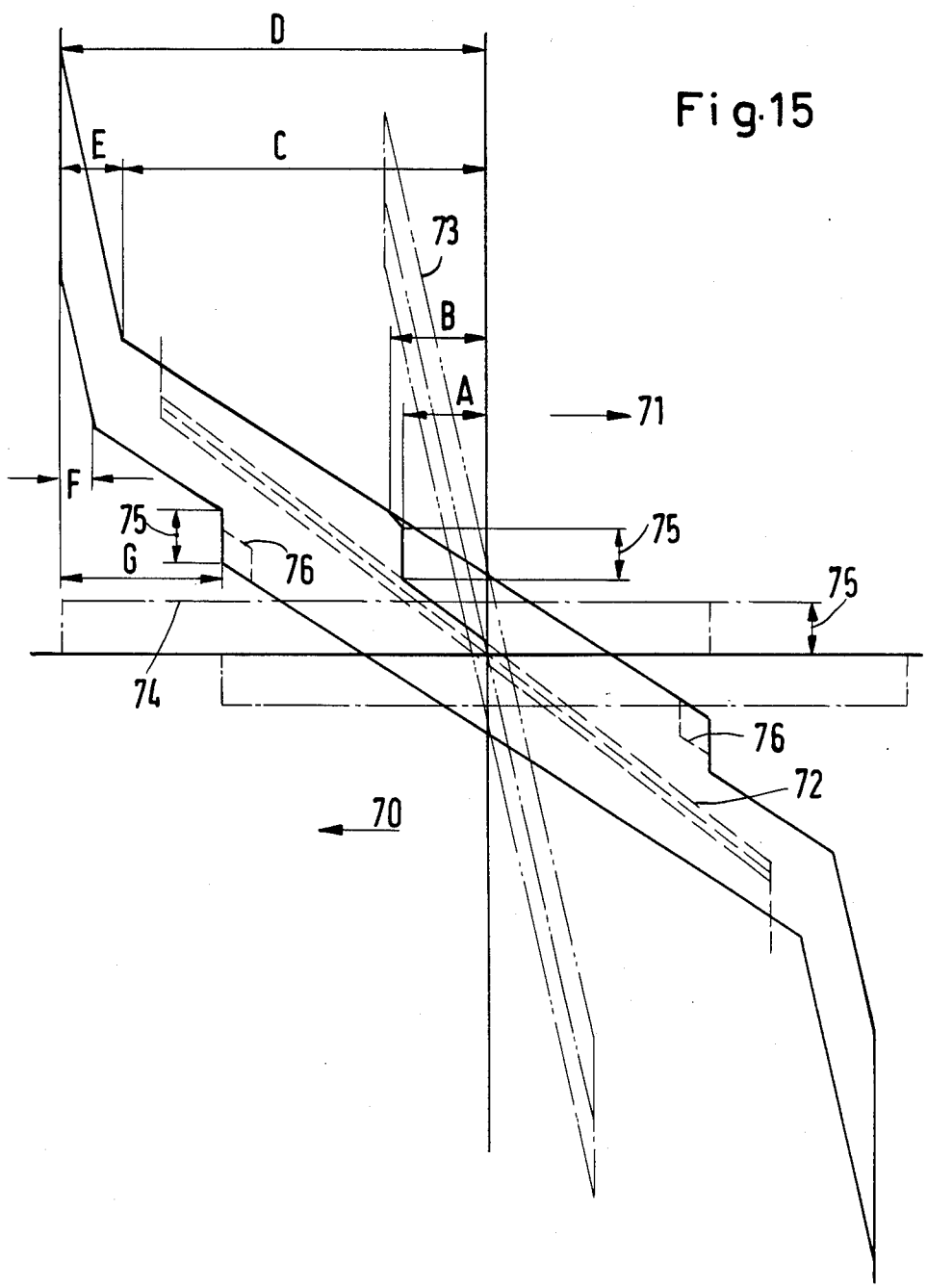

APPARATUS FOR COMPENSATING FOR FLUCTUATIONS OF TORQUE BETWEEN COAXIAL FLYWHEELS IN A MOTOR VEHICLE

CROSS-REFERENCE TO RELATED CASES

The apparatus of the present invention constitutes an improvement over and a further development of torque compensating apparatus which are disclosed in numerous pending United States patent applications and granted United States Letters Patent of the assignee. Reference may be had, for example, to commonly owned patent applications Ser. Nos. 661,028 (filed Oct. 15, 1984), 669,657 (filed Nov. 8, 1984), 669,658 (filed Nov. 8, 1984), 669,659 (filed Nov. 8, 1984), 669,769 (filed Nov. 8, 1984), 669,770 (filed Nov. 8, 1984), 669,768 (filed Nov. 8, 1984), 716,838 (filed Mar. 28, 1985), 717,327 (filed Mar. 29, 1985), 706,498 (filed Feb. 28, 1985), 745,016 (filed June 14, 1985), 801,565 (filed Nov. 25, 1985) and 799,006 (filed Nov. 18, 1985).

BACKGROUND OF THE INVENTION

The invention relates to torque compensating apparatus in general, and more particularly to improvements in apparatus which can be utilized to counteract abrupt changes in torque which is transmitted between the output element of the engine and the input element of the change-speed transmission in a motor vehicle. Still more particularly, the invention relates to improvements in compensating apparatus of the type wherein a damping means is interposed between two coaxial components which are rotatable relative to each other within preselected limits, one of which can be driven by the output element of the engine and the other of which can drive the input element of the change-speed transmission in a motor vehicle.

German Offenlegungsschrift No. 28 26 274 discloses two coaxial flywheels one of which is driven by the engine and the other of which can drive the input element of the transmission in a motor vehicle. Friction generating means is interposed between the two flywheels to oppose angular movements of such flywheels within limits which are imposed by complementary stops. The friction generating means is operative within the full range of angular movability of the two flywheels relative to each other i.e., the friction generating element or elements of such friction generating means oppose each and every angular displacement of one flywheel relative to the other flywheel, or vice versa. The magnitude of friction is constant. This creates problems under certain circumstances, namely the damping means employing such friction generating means is incapable of ensuring adequate damping action under any and all circumstances and within the full range of angular movability of the flywheels relative to each other.

OBJECTS AND SUMMARY OF THE INVENTION

An object of the invention is to provide a novel and improved torque compensating apparatus whose versatility exceeds that of heretofore known apparatus and which can be used in many types of motor vehicles (as well as for numerous other purposes) as a superior substitute for heretofore known apparatus.

Another object of the invention is to provide an apparatus which can be designed to serve its intended purpose with a higher degree of efficiency than heretofore known apparatus.

A further object of the invention is to provide a torque compensating apparatus whose capacity to compensate for abrupt changes of torque between two coaxial components (such as two coaxial flywheels) is much greater than that of conventional apparatus.

An additional object of the invention is to provide a relatively simple, compact and inexpensive apparatus which can be assembled in automatic machines, which comprises a relatively small number of component parts, and which can be installed between conventional flywheels or like rotary components without necessitating any, or by necessitating only negligible, changes in the design and mounting of such components.

Still another object of the invention is to provide the apparatus with novel and improved damping means.

A further object of the invention is to provide the damping means with novel and improved friction generating means.

An additional object of the invention is to provide a novel and improved method of assembling the means for damping the angular movements of two coaxial flywheels or analogous rotary components relative to each other within the desired range and with a desired force.

A further object of the invention is to provide a motor vehicle which embodies the improved torque compensating apparatus.

Another object of the invention is to provide a torque compensating apparatus which can prolong the useful life of the power train between the output element of the engine and the input element of the change-speed transmission in a motor vehicle.

The invention resides in the provision of a torque compensating apparatus, particularly in the provision of an apparatus for counteracting abrupt changes of torque which is transmitted in a motor vehicle between the output element of the engine and the input element of a change-speed transmission. The apparatus comprises a first rotary component which receives torque from the output element of the engine, a second rotary component which is coaxial with the first component and serves to transmit torque to the input element of the transmission, and damping means for yieldably opposing rotation of the two components (which are rotatable relative to each other within a first angle) relative to each other. The damping means comprises at least one friction generating device and means for deactivating the friction generating device during rotation of the components relative to each other through a smaller second angle upon each reversal of the direction of rotation of one component with reference to the other component.

The friction generating device can comprise a friction ring which is disposed between the two components to yieldably oppose rotation of the components relative to each other within the first angle minus the second angle. The deactivating means of such apparatus can include means for shifting the second angle relative to the boundaries of angular movability of the two components within the first angle. The damping means of such apparatus can further comprise energy storing means (such as one or more sets of coil springs) which determine the aforementioned boundaries.

The friction generating device is preferably mounted on one of the components and includes a first abutment, and the deactivating means is preferably provided on the other of the components and includes a second abutment. The abutments are movable relative to each other about the common axis of the components through the second angle. The damping means is preferably flanked by the two components, as considered in the direction of the common axis of the two components. In accordance with a presently preferred embodiment, the damping means is mounted on the first component. Such first component can be provided with an axial protuberance, and the damping means is preferably mounted concentrically on and surrounds the protuberance of the first component. Such protuberance can constitute a centrally located axially extending stub.

The apparatus preferably further comprises an antifriction bearing which is interposed between the two components and surrounds the protuberance of the first component. Such apparatus preferably comprises a radially extending flange which can constitute an integral part of the first component. The damping means is preferably disposed between such flange and the antifriction bearing. The inner race of the bearing is preferably mounted directly on the protuberance of the first component, and the outer race of such bearing spacedly surrounds the inner race and confines therewith one or more annuli of spherical or otherwise configurated antifriction rolling elements. The damping means can be disposed between the inner race of the bearing and the flange of the first component, as considered in the axial direction of the two components.

The friction generating device can comprise means for biasing the friction ring axially toward the flange of the first component. The biasing means can comprise a diaphragm spring which reacts against one of the two races of the bearing and bears against the friction ring to urge the latter against the flange of the first component. The friction generating device can further comprise a distancing ring in the form of an annular insert which is interposed between the one race (for example, the inner race of the bearing) and the diaphragm spring. The radially innermost portion of the diaphragm spring is preferably in direct contact with the distancing ring. Such friction generating device can further comprise a washer which is installed between the diaphragm spring and the friction ring. A second or intermediate washer can be installed between the first mentioned washer and the diaphragm spring. The radially outermost portion of the diaphragm spring can bear directly against the intermediate washer. A further washer can be installed between the friction ring and the flange of the first component.

The friction ring is preferably arranged to share the angular movements of the first component, and the deactivating means of such apparatus can comprise two prongs which are provided on and extend radially of the friction ring, and an abutment which is provided on the second component and is disposed between the prongs with a certain clearance such that the friction ring and the abutment are free to move angularly relative to each other through the second angle. The abutment can comprise or constitute a rivet having a portion which is disposed between the two prongs or the friction ring. The damping means can further comprise an input element which is provided on the first component and an output element which is provided on the second component and is movable with reference to the input element within the first angle. The aforementioned rivet can be provided with means for fixing one of the input and output elements to the respective component, preferably for fixing the second or output element to the second component.

In accordance with a second embodiment of the invention, the friction generating device comprises a friction ring and means for biasing the friction ring toward one of the components. The deactivating means of such apparatus can comprise an abutment which is provided on the friction ring and a slotted member which is provided on the second component and receives the abutment with a clearance which enables the friction ring and the second component to turn relative to each other through the second angle. The abutment can comprise a lug which is integral with the friction ring and extends substantially axially of the two components. The first component preferably includes a radially extending flange, and the friction generating device of such apparatus further comprises a washer which is interposed between the flange and the friction ring. The washer is in frictional engagement with the friction ring. Such washer can be provided with first stop means, and the first component can be provided with second stop means cooperating with the first stop means so as to enable the first component and the washer to perform limited angular movements relative to each other. The first stop means can comprise a substantially axially extending lug which is provided on the washer, and the second stop means can constitute a portion of the flange. Such portion of the flange can be provided with a recess into which the lug extends with a predetermined clearance, as considered in the circumferential direction of the washer.

The second angle preferably deviates from the angle through which the first and second stop means are movable relative to each other. As a rule, the second angle will exceed the angle through which the stop means are movable relative to each other. The friction generating device of the second apparatus can further comprise an intermediate washer which is installed between the first named washer and the flange. The two washers can be placed into direct frictional engagement with each other. Such washers are preferably arranged to transmit to each other a first moment of friction, and the friction ring and the first named washer are preferably arranged to transmit to each other a lesser second moment of friction. The moment of friction which is transmitted between the intermediate washer and the flange of the first component preferably does not exceed the first moment of friction.

At least one of the parts including the friction ring and the first mentioned washer can be provided with at least one rib which is in direct frictional engagement with the other of these parts.

In accordance with a third embodiment of the present invention, the friction generating device comprises a prestressed diaphragm spring. The first component of such apparatus preferably includes a radially extending flange and an axially extending protuberance. The friction generating device of such apparatus further comprises a ring-shaped retainer on the protuberance. The diaphragm spring has a first annular portion which reacts against the retainer and a second annular portion which bears against the flange of the first component. The retainer can have a substantially L-shaped cross-sectional outline, and such apparatus further comprises antifriction bearing means interposed between the first and second components and having two races and antifriction rolling elements between the two races. The retainer can include an axially extending portion which abuts one of the races, as considered in the axial direction of the two components. The retainer can further comprise a radially extending portion having a bead which abuts against the diaphragm spring. Such apparatus can further comprise means for non-rotatably connecting the retainer to one of the first and second components.

The friction generating device of the third apparatus can further comprise a washer which is interposed between the diaphragm spring and one of the two components. Such washer can be non-rotatably secured to the first component. The first component can be provided with an annular seat and the washer can include a sleeve-like portion which is a press-fit on the seat.

The diaphragm spring is mounted on one of the first and second components, and the deactivating means of such apparatus can comprise first abutment means on the diaphragm spring and second abutment means provided on the second component and cooperating with the first abutment means to limit the angular movability of the first and second abutment means relative to each other to the second angle. The first abutment means can include two substantially radially extending prongs on the diaphragm spring, and the second abutment means can comprise an axially extending projection provided on the second component and being received between the two prongs with a clearance which enables the spring and the second component to turn relative to each other through the second angle. The second abutment means can comprise a rivet which is rigid with the second component. As mentioned before, the damping means can further comprise an input element which is provided on the first component and an output element which is provided on the second component and is movable with reference to the input element within the first angle. The rivet can include means for affixing the output element to the second component.

In accordance with a further embodiment of the invention, the friction generating device of the improved apparatus comprises a prestressed diaphragm spring and two friction rings which flank the diaphragm spring. The diaphragm spring has a first annular portion which is in contact with one of the rings and a larger-diameter second annular portion which is in contact with the other of the rings. The friction rings and the diaphragm spring can have torque transmitting portions which compel the friction rings to share all angular movements of the spring and vice versa. The torque transmitting portions can include substantially axially extending projections on the friction rings, and the torque transmitting portions of the diaphragm spring can include teeth which mate with the projections of the friction rings. The teeth can include a first annulus of teeth mating with the projections of one of the friction rings and a larger-diameter second annulus of teeth mating with the projections of the other friction ring. The spring is provided with tooth spaces which alternate with the teeth and are open in the radial direction of the spring.

One component of such apparatus is provided with a radially extending flange, and one of the friction rings is disposed between the flange and the diaphragm spring. Such apparatus further comprises an antifriction bearing between the first and second components. The other friction ring is preferably disposed between the diaphragm spring and the bearing. The first component preferably comprises a radial flange and one of the friction rings preferably bears directly against the flange.

The bearing preferably comprises first and second races and an annulus of antifriction rolling element between the two races. Such apparatus preferably further comprises an annular insert which is installed between one of the races and the second friction ring. The first component is preferably provided with an axially extending protuberance which is surrounded by the races and by the insert. The second ring is preferably provided with an annulus of axially extending projections, and the spring is preferably provided with an annulus of substantially radially inwardly extending teeth which mate with such projections. That friction ring which is adjacent to the radial flange of the first component can be provided with an annulus of substantially axially extending projections, and the diaphragm spring is then provided with an annulus of radially outwardly extending teeth which mate with such projections.

Each of the two friction rings can be provided with an annulus of convex surfaces which are in contact with the diaphragm spring.

The deactivating means of such apparatus can comprise first abutment means which is provided on the diaphragm spring and second abutment means provided on one of the components, preferably on the second component. The second abutment means cooperates with the first abutment means to permit the spring and the one component to move relative to each other through the second angle. The first abutment means of such apparatus can comprise two circumferentially spaced-apart prongs on the diaphragm spring, and the second abutment means can comprise an axial projection which is provided on the one component and is received with clearance between the prongs of the diaphragm spring. The second abutment means can comprise a rivet. The damping means of such apparatus preferably further comprises an input element which is provided on the other component (preferably on the first component) and an output element which is secured to the one component by a rivet forming part of or including the aforementioned axial projection of the second abutment means. The input and output elements have freedom of angular movement relative to each other through the first angle.

The inner diameter of one of the friction rings preferably exceeds the outer diameter of the other friction ring. That friction ring which is adjacent to the radial flange of the respective component is preferably provided with a plurality of radially outwardly extending fingers extending into substantially radially extending slots provided therefor on the diaphragm spring. Such diaphragm spring can be provided with pairs of teeth which flank the slots, and each pair of teeth is preferably composed of a shorter tooth and a longer tooth, as considered in the radial direction of the diaphragm spring.

In accordance with an additional embodiment of the invention, one of the components has a radial flange and the friction generating device comprises a friction ring having an inner annular portion immediately adjacent to the flange and outer annular portion. The deactivating means of such apparatus comprises first abutment means on the outer annular portion of the friction ring and second abutment means provided on the other component and being movable relative to the first abutment means within the second angle. The first abutment means can comprise two prongs extending radially outwardly of the friction ring. The second abutment means of such apparatus can comprise an axial projection provided on the other component and received between the prongs with limited freedom of angular movement. Such projection can constitute a rivet. The damping means of such apparatus can further comprise an input element provided on the one component and an output element provided on the other component and cooperating with the input element to limit the angular movements of the two components relative to each other to the first angle. The second abutment means can comprise a rivet which secures the output element to the other component. The outer annular portion of the friction ring can comprise an axially extending radially outermost section. Such friction generating device can further comprise a first friction washer and a diaphragm spring within the radially outermost section of the outer annular portion. The diaphragm spring is preferably installed in prestressed condition between the inner radial portion and the first washer. The other component can comprise an annular portion which abuts against the washer. The damping means can further comprise an input element on the one component and an output element on the other component. Such elements are movable relative to each other within the first angle, and the output element can include the annular portion of the other component. The friction generating device of the just discussed apparatus can further comprise a second friction washer and a second diaphragm spring which is surrounded by the first washer and the first diaphragm spring. The second diaphragm spring is disposed between the inner annular portion and the second washer. Such damping device can further comprise an annular insert which is arranged to share all angular movements of the one component and abuts axially against the second washer. The friction ring is mounted on the one component. The second washer can have a substantially L-shaped cross-sectional outline.

In accordance with an additional embodiment of the invention the friction generating device of the improved apparatus comprises at least two friction rings, and one of the rings has means for transmitting torque to the other of the rings. In such apparatus, the rings are mounted on one of the components and the deactivating means preferably comprises first abutment means provided on the one ring and second abutment means provided on the other of the components and cooperating with the first abutment means to limit the angular movements of the one ring relative to the other component to the second angle. The first abutment means can include the torque transmitting means. The first abutment means can have an axially extending arm on the one ring, and the second abutment means can be provided with a recess in which the arm is movable within the second angle. The other ring of damping means in the just described apparatus can have an opening for the torque transmitting means. Such torque transmitting means is received in the opening with limited first freedom of movement about the common axis of the two components. The friction rings are mounted on one of the components, and the deactivating means of such apparatus comprises a portion of the other of the two components. Such portion of the other component can be provided with a recess into which the torque transmitting means extends with greater second freedom of movement about the common axis of the two components.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 15 is a torsion diagram of the friction generating device of FIGS. 1 to 4.

DESCRIPTION OF THE PREFERRED EMBODIMENTS

Figure 1:
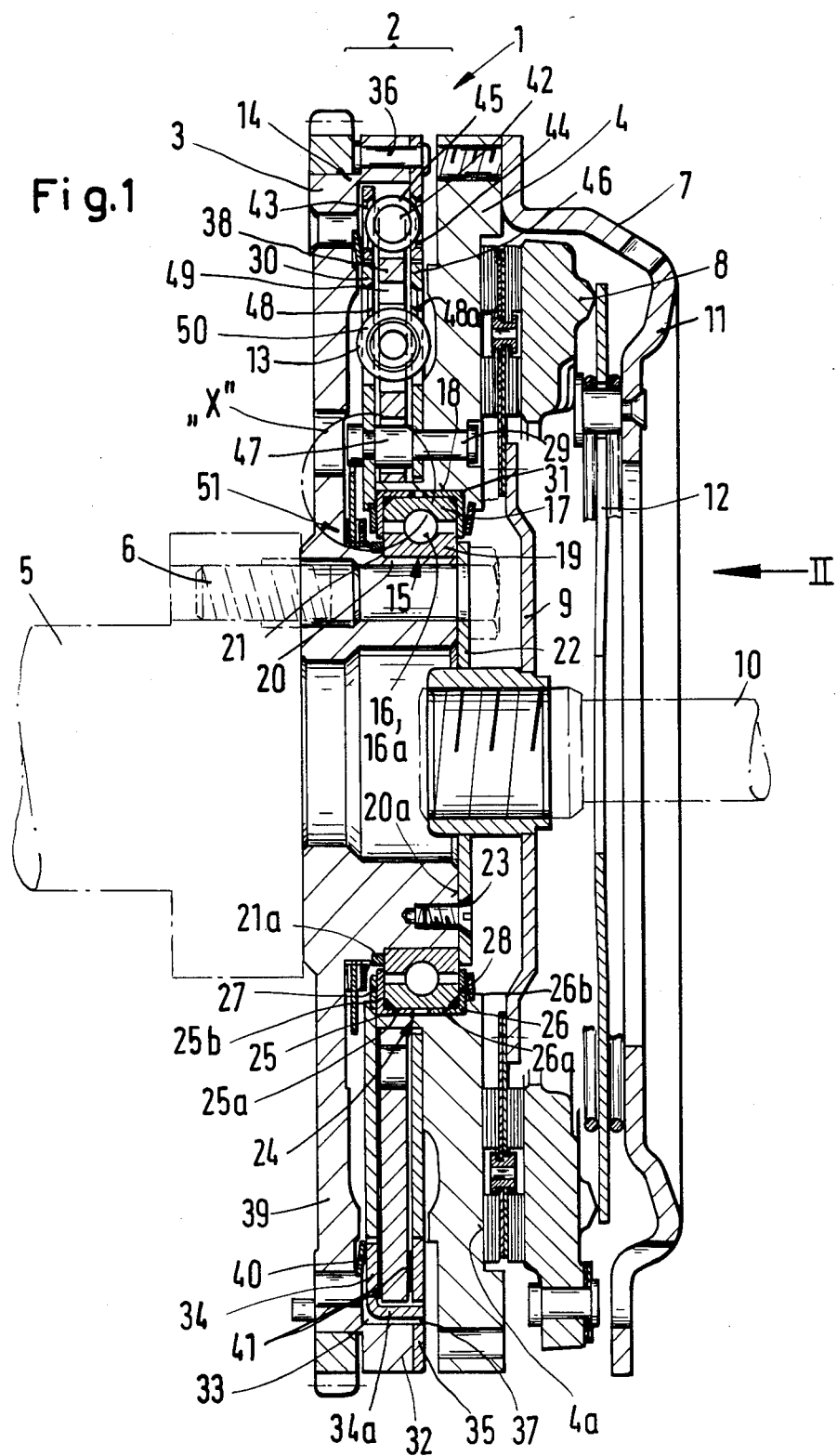
FIG. 1 is an axial sectional view of an apparatus which embodies one form of the invention and is installed in the power train between the crankshaft of the internal combustion engine and the input element of the change-speed transmission in a motor vehicle.

The torque compensating apparatus 1 of FIGS. 1 to 4 comprises a composite flywheel 2 having two coaxial components 3 and 4. The component 3 is affixed to the output element (crankshaft 5) of the internal combustion engine in a motor vehicle by a set of axially parallel bolts 6, and the component 4 can transmit torque to the input element 10 of a change-speed transmission by way of a friction clutch 7. The cover or housing 11 of the clutch 7 is secured to and rotates with the component 4. The clutch 7 further comprises a pressure plate 8 which is coaxial with and is movable axially relative to the component 4 within the confines of the cover 11. A diaphragm spring 12 reacts against the cover 11 and bears against the pressure plate 8 to urge the latter against the adjacent friction lining of a clutch disc 9 so that the other lining of the clutch disc is in torque-receiving engagement with the component 4. The clutch disc 9 transmits torque to the input element 10 of the change-speed transmission. The means for disengaging the clutch 7 (by changing the conicity of the diaphragm spring 12) is known and is not specifically shown in the drawing.

The components 3 and 4 of the composite flywheel 2 are rotatable relative to each other within an angle corresponding to the gap 65+66 (FIG. 2), and the apparatus 1 comprises means for damping the angular movements of the components 3, 4 relative to each other in a novel and improved way. The damping means comprises a first damping unit 13 and a second damping unit 14 which latter is disposed radially outwardly of the unit 13. The units 13 and 14 are connected in series, i.e., one of these units is active when the other is idle or one of these units can operate within a first range of angular movability of the components 3, 4 relative to each other and the other unit takes over when the first range is exceeded or such other unit cooperates with the first unit during the remaining range of angular movability of the two components of the composite flywheel 2.

The apparatus 1 further comprises an antifriction bearing 15 which is interposed between the components 3 and 4. The illustrated bearing 15 comprises a radial antifriction bearing 16 with an inner race 19, an outer race 17 which surrounds the inner race 19, and a single annulus of spherical rolling elements 16a between the two races. The outer race 17 is received in a bore 18 of the component 4, and the inner race 19 surrounds an axial protuberance or stub 20 of the component 3. The protuberance 20 extends in a direction away from the crankshaft 5 and into the bore 18 of the component 4. The race 19 is a press-fit on the protuberance 20 and is held against any axial movement by a radial shoulder 21 of the component 3 as well as by a washer-like retainer 22 which is separably secured to the component 3 by screws 23 or analogous fasteners so that it abuts the surface 20a of the protuberance 20. A distancing ring 21a is inserted between the shoulder 21 and the adjacent end face of the inner race 19.

A heat barrier 24 is installed between the outer race 17 and the component 4 to prevent the transfer of heat from the friction surface 4a of the component 4 to the antifriction bearing 15. The surface 4a is engaged by the respective lining of the clutch disc 9 when the clutch 7 is operative to transmit torque from the component 4 to the input element 10 of the change-speed transmission. The provision of thermal barrier 24 is desirable and advantageous because it prevents overheating of the mass of grease which fills the space between the races 17, 19 as well as an overheating and undue thermally induced distortion and expansion of the elements of the bearing 15. Excessive expansion and/or deformation of the races 17, 19 could result in jamming of the rolling elements 16a. A portion of the thermal barrier 24 is installed in the space around the outer race 17; to this end, the diameter of the surface surrounding the bore 18 exceeds the outer diameter of the race 17.

The illustrated thermal barrier 24 comprises two rings 25, 26 each of which has an L-shaped cross-sectional outline. The annular portions 25a, 26a of these rings surround the periphery of the outer race 17 and the radially inwardly extending portions 25b, 26b of these rings are respectively adjacent to the left-hand and right-hand end faces of the races 17, 19 (as viewed in FIG. 1). The radially innermost parts of the radially extending portions 25b, 26b abut the respective end faces of the inner race 19 to thereby confine the grease in the space between the races (i.e., in the space for the rolling elements 16a). In order to enhance the sealing action of the radially extending portions 25b and 26b, such portions are biased against the respective end faces of the inner race 19 by two discrete resilient elements here shown as diaphragm springs 27, 28. The radially outermost portion of the diaphragm spring 27 reacts against a shoulder which is provided on a disc 30 secured to the component 4 by rivets 29 (only one can be seen in FIG. 1), and the radially innermost portion of the diaphragm spring 27 bears against the radially extending portion 25 of the ring 25, preferably against the radially innermost part of the portion 25b. The radially outermost portion of the diaphragm spring 28 reacts against a shoulder of the component 4, and the radially innermost portion of the spring 28 bears against the radially innermost part of the radial portion 26b. When the components 3, 4 are caused to turn relative to each other, the radially innermost parts of the radially extending portions 25b, 26b slide along the respective end faces of the race 19 and generate a damping action which is effective during each and every stage of angular movement of the component 3 relative to the component 4 and/or vice versa.

The entire radial antifriction bearing 16 is fixed in an optimum axial position between the components 3 and 4 by being installed between the radially extending portions 25b, 26b of the rings 25, 26. The ring 25 abuts or can abut the disc 30, and the ring 26 abuts or can abut an internal shoulder 31 of the component 4.

The radially outermost portion of the component 3 has an annular portion 32 which surrounds a chamber 33 for the major parts of or the entire damping units 13 and 14. The input element of the second damping unit 14 includes two spaced-apart coaxial discs 34 and 35 which are non-rotatably affixed to the component 3. The disc 35 is affixed to the end face of the annular portion 32 by rivets 36. The disc 34 has axially extending projections in the form of lugs 34a which are disposed at the periphery of the disc 34 and extend axially of the flywheel 2 toward and into recesses 37 which are machined into or otherwise formed in the disc 35. The surfaces surrounding the recesses 37 cooperate with the lugs 34a to prevent rotation of the discs 34, 35 relative to each other. However, the recesses 37 and the lugs 34a enable the discs 34, 35 to move axially toward and away from each other. The space between the discs 34, 35 receives a flange 38 which is the output element of the damping unit 14 and the input element of the damping unit 13. The flange 38 carries friction linings 41 and is biased toward the disc 35 by an energy storing device in the form of a diaphragm spring 40. This spring reacts against a radially outwardly extending flange 39 of the component 3 and bears against the disc 34 which is thereby urged axially against the flange 38 which, in turn, is biased against the disc 35. The friction linings 41 can include annuli of friction generating segments which are glued or otherwise affixed to the respective sides of the flange 38. The flange 38 and the discs 34, 35 are respectively provided with registering windows 42, 43, 44 for discrete energy storing elements in the form of coil springs 45. These springs oppose angular movements of the discs 34, 35 relative to the flange 38 and vice versa.

The damping unit 13 further comprises an output element including the forementioned disc 30 and a further disc 46. The discs 30, 46 are fixedly secured to each other by a set of distancing elements in the form of rivets 47 on the component 4. The rivets 47 ensure that the discs 30, 46 are held at a predetermined axial distance from each other and cannot rotate relative to the component 4.

The discs 30, 46 are formed with windows 48, 48a which register with windows 49 in the flange 38 to receive discrete energy storing elements in the form of coil springs 50. These springs oppose angular displacements of the discs 30, 46 relative to the flange 38 and vice versa.

The damping means of the apparatus which is shown in FIGS. 1 to 4 further comprises a friction generating device 51 which is effective only within a predetermined range of angular movements of the components 3 and 4 relative to each other. The device 51 surrounds the protuberance 20 of the component 3 and is disposed between the inner race 19 of the radial antifriction bearing 16 and the flange 39 of the component 3. An energy storing element 52 of the friction generating device 51 constitutes a diaphragm spring (see particularly FIG. 3) whose radially outermost portion reacts against a washer 53 and whose radially innermost portion bears against the distancing ring 21a. A friction ring 54 is interposed between the washer 53 and the flange 39 of the component 3. The radially innermost portion of the friction ring 54 is disposed between two additional friction generating washers 55, 56. The washer 53 cannot rotate relative to the component 3.

Figure 4:
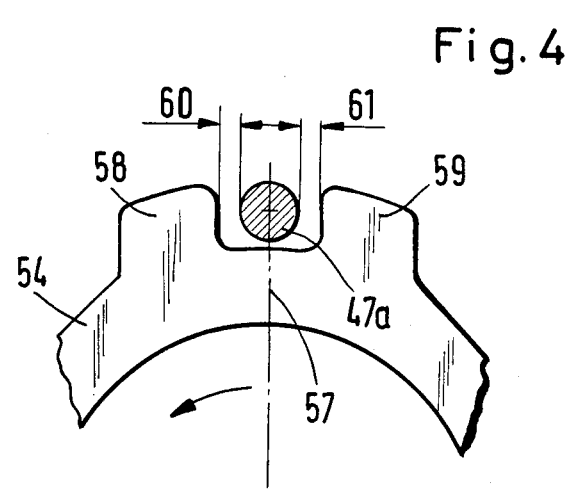
FIG. 4 is a smaller-scale fragmentary sectional view as seen in the direction of arrows from the line IV—IV in FIG. 3.

The friction ring 54 has radially outwardly extending abutments in the form of prongs 58, 59 so that the corresponding portion 57 of the ring 54 is bifurcated (see FIG. 4). The space between the prongs 57, 58 receives a further abutment 47a which constitutes the shank of a rivet 47 forming part of the aforementioned rivet 29 which connects the discs 30, 46 to the component 4. The clearance 60+61 between the prongs 58, 59 and the abutment 47a determines the extent to which the friction ring 54 and the component 4 can turn relative to each other. The angle corresponding to the clearance 60+61 is smaller than the maximum angle through which the components 3 and 4 can turn relative to each other. The friction ring 54 can be formed with several pairs of prongs 58, 59 and each such pair of prongs can flank a discrete abutment 47a. It will be seen that the friction ring 54 does not cooperate with the energy storing coil springs 45, 50 and/or with any other means acting in the circumferential direction of the composite flywheel 2. In other words, the friction ring 54 can be rotated with reference to the component 3 only when the abutment 47a engages the prong 58 or 59. The clearance 60+61 determines the extent to which the friction ring 54 can freely turn against the moment of friction which is generated by the device 51. Consequently, when the direction of angular movement of the component 3 relative to the component 4 is changed (or vice versa), the abutments 58–59 and 47a constitute a deactivating means which ensures that the friction generating device 51 is ineffective (deactivated) to an extent which is determined by the clearance 60+61. The abutment 47a preferably assumes the position which is shown in FIG. 4 (i.e., substantially midway between the prongs 58, 59 of the friction ring 54) when the apparatus of FIGS. 1 to 4 is assembled.

The clearance 60+61 entails a shifting of that range within which the friction generating device 51 is effective with reference to the boundaries established by the energy storing springs 45 and 50. In other words, the clearance 60+61 determines those angular positions of the components 3 and 4 relative to each other in which the springs 45, 50 begin to store energy or when they store additional energy (if they are installed in prestressed condition).

Figure 2:
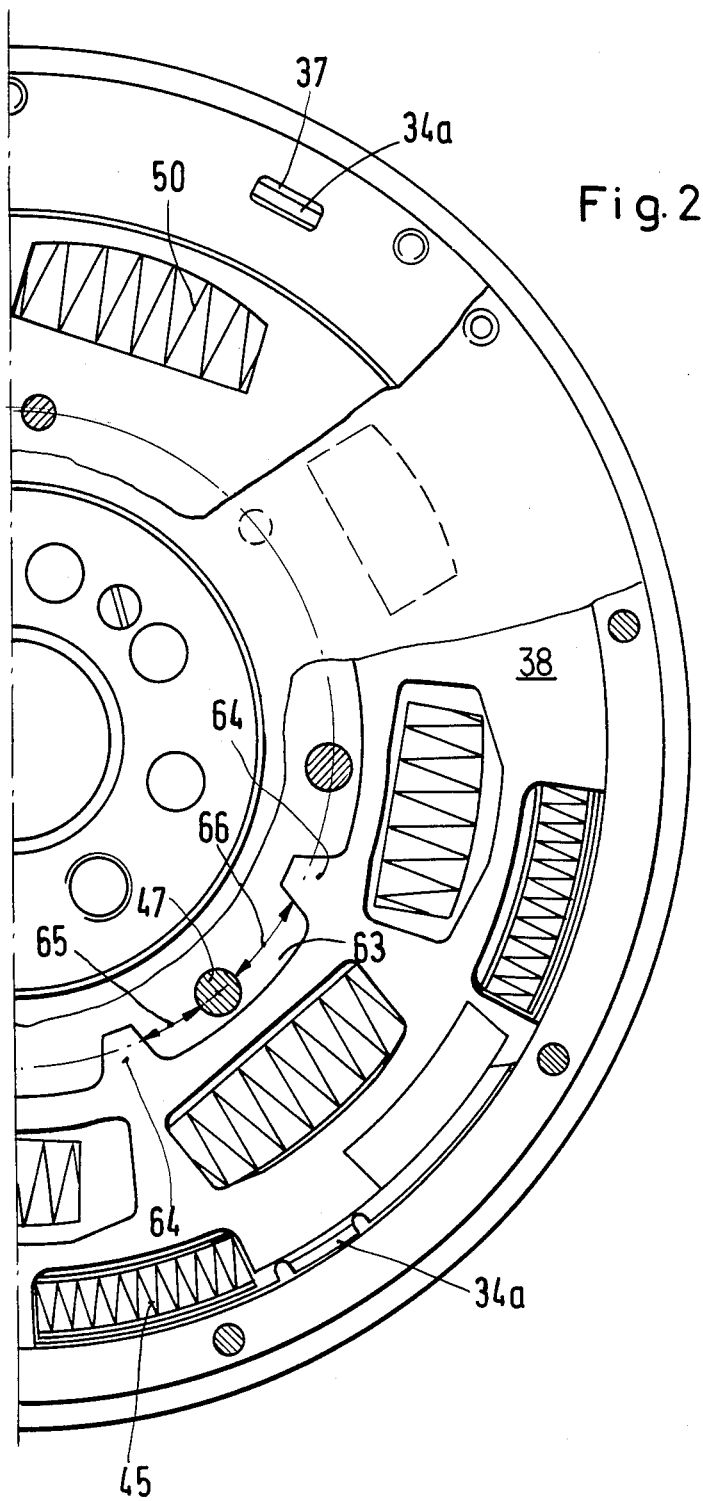
FIG. 2 is a fragmentary elevational view of the apparatus as seen in the direction of arrow II in FIG. 1, with the friction clutch between the second component and the input element of the transmission omitted.
Figure 3:
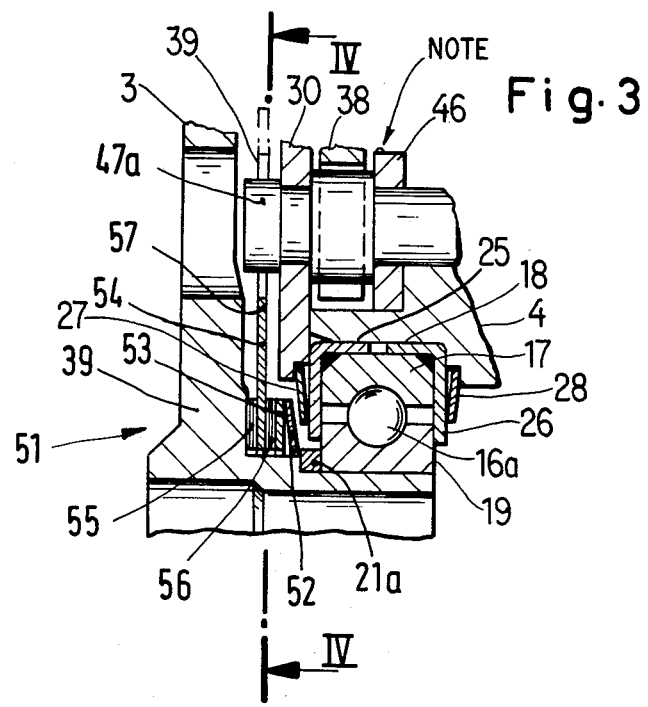
FIG. 3 is an enlarged view of the detail within the phantom-line circle "X" in FIG. 1.

FIG. 2 shows that the radially innermost portion of the flange 38 is formed with teeth 64 alternating with tooth spaces 63. Portions of the rivets 47 are received in the tooth spaces 63 with considerable play (65+66) which determines the angle through which the components 3 and 4 can turn relative to each other. The angle corresponding to the play 65+66 also determines the extent to which the damping unit 13 is effective. The extent to which the components 3, 4 can turn relative to each other can be reduced to less than the length of the composite gap 65+66 if the springs 45 are fully compressed before the component 3 or 4 completes its angular movement through the angle which is determined by the gap 65+66.

Since the friction ring 54 is not biased by the springs 45 and/or 50, it is not automatically returned to a predetermined starting or intermediate position when the action of the friction generating device 51 comes to an end.

The deactivating means 58–59, 47a can be modified in a number of ways without departing from the spirit of the invention. For example, the abutment 47a can be replaced with a radially extending abutment and the prongs 58, 59 can be replaced with axially extending prongs which flank the radially extending abutment with a play corresponding to the clearance 60+61.

The washer 53 of the friction generating device 51 ensures that the bias of the diaphragm spring 52 is transmitted to the entire washer 56, i.e., the washer 53 prevents the generation of excessive localized stresses. The washers 53, 55 and 56 can be modified and/or replaced with different washers if the manufacturer desires to change the frictional damping action of the device 51 so as to ensure an optimal friction generating action in a particular type of power train. The rivets 47 may but need not be integral with the rivets 29. The illustrated design is preferred because it is not necessary to provide first means for affixing the discs 30, 46 to the component 4 and discrete second means for use as abutment or abutments between one or more pairs of prongs 58, 59 of the friction ring 54. If the prongs 58, 59 extend in the axial direction of the composite flywheel 2, the component 4 (or a part which is carried by the component 4) can be provided with recesses which receive the prongs of the friction ring with a play corresponding to the clearance 60+61. The arrangement may be similar to that including the lugs 34a of the disc 34 and the recesses 37 of the disc 35.

Figure 5:
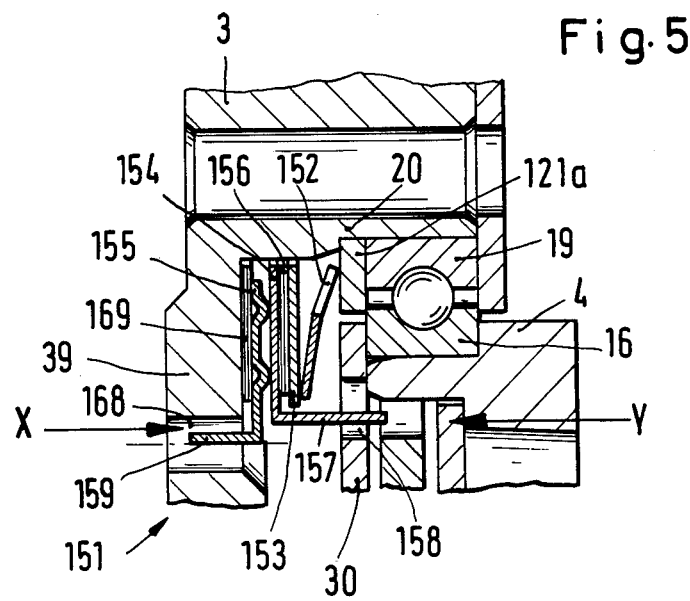
FIG. 5 is a fragmentary sectional view similar to that of FIG. 3 but showing the friction generating device of the second apparatus.
Figure 6:
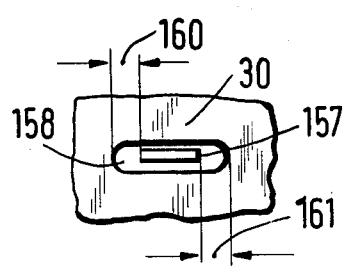
FIG. 6 is a view as seen in the direction of arrow X in FIG. 5.
Figure 7:
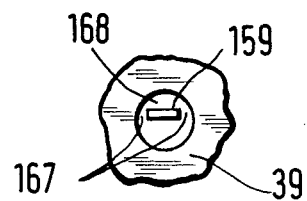
FIG. 7 is a view as seen in the direction of arrow Y in FIG. 5.

FIGS. 5 to 7 show a portion of a second apparatus with a modified friction generating device 151 which is mounted on and surrounds the protuberance 20 of the component 3. The manner in which the component 3 is coupled to the crankshaft of an internal combustion engine in a motor vehicle is the same as shown in FIG. 1. The protuberance 20 further carries the inner race 19 of a radial antifriction bearing 16. The friction generating device 151 is disposed between the flange 39 of the component 3 and the inner race 19. This device comprises a diaphragm spring 152 whose radially innermost portion reacts against the inner race 19 and whose radially outermost portion bears against a washer 153. An insert 121a in the form of a distancing ring is interposed between the diaphragm spring 152 and the race 19. A first friction ring 154 is inserted between the washer 153 and a washer-like second friction ring 155. A further washer 156 is installed between the washer 153 and the friction ring 154. The radially outermost portion of the friction ring 154 is provided with abutments in the form of axially extending lugs or prongs 157 which are received in recesses or slots 158 of the disc 30 with a clearance 160+161 which determines the extent to which the friction ring 154 can turn relative to the component 4 and vice versa. The abutments 157 and the abutments which are constituted by the surfaces surrounding the respective recesses 158 constitute the means for deactivating the friction generating device 151 in response to a change in the direction of rotation of the component 3 or 4 relative to the component 4 or 3. The disc 30 is rigid with the component 4, the same as in the apparatus 1 of FIGS. 1 to 4.

The radially outermost portion of the second friction ring 155 is provided with axially extending lugs 159 which constitute stops and extend into circular recesses (e.g., holes) 168 of the flange 39. The stops 159 extend into the respective recesses 168 with a clearance 167 (FIG. 7).

The friction ring 155 is formed with several ring-shaped ribs which are in direct contact with the adjacent surface of the friction ring 154. A washer 169 is interposed between the friction ring 155 and the flange 39 of the component 3. The friction generating action of the washer 169 is selected in such a way that the moment of friction between the rings 154, 155 exceeds the moment of friction between the washer 169 and the friction ring 155 and/or the moment of friction between the washer 169 and the flange 39 of the component 3.

The clearance 160+161 between the abutments 30, 157 of FIG. 6 is greater than the clearance 167 between the stop 159 and the surface surrounding the recess 168 of FIG. 7. The clearance 167 determines the extent to which the friction ring 155 is turnable with reference to the component 3.

An advantage of the structure which is shown in FIGS. 5 to 7 is that it allows for a stepwise intensification of friction because the second friction ring 155 is first entrained by the friction ring 154 until the stops 159 engage the surfaces surrounding the respective holes 168 and the ring 154 then rotates relative to the ring 155 to generate a more pronounced friction if the components 3, 4 continue to turn relative to each other.

As mentioned above the clearance 167 is or can be less than the clearance 160+161. The ribs can be provided on the friction ring 155 and/or on the friction ring 154; the ribs on one of these friction rings bear directly against the other friction ring.

Figure 8:
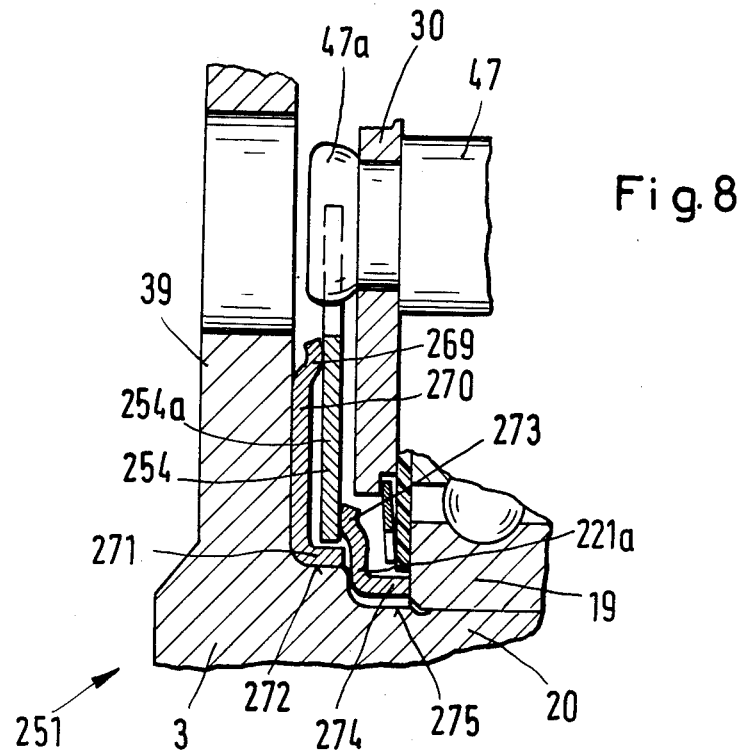
FIG. 8 is a view similar to that of FIG. 3 but showing a portion of a third friction generating device.
Figure 9:
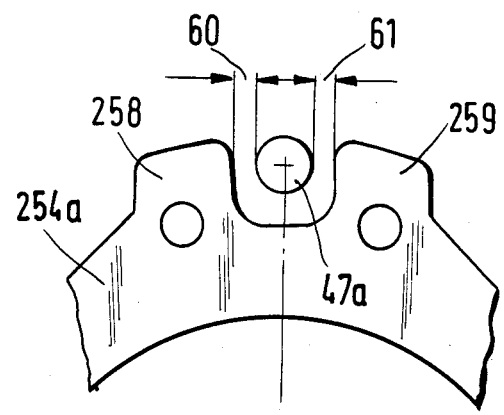
FIG. 9 is a smaller-scale view of a detail as seen from the left-hand side of FIG. 8.

The friction generating device 251 of FIG. 8 comprises a friction ring 254 which constitutes a prestressed diaphragm spring having an annular main section 254a whose radially outermost part is integral with radially outwardly extending abutments or prongs 258, 259 (see FIG. 9) cooperating with the abutment 47a to define the clearance 60+61 for angular movement of the friction ring 254 relative to the component 4. The radially outermost part of the annular section 254a bears against an annular rib 269 of a washer 270 which abuts the flange 39 of the component 3. The radially innermost portion 271 of the washer 270 is a sleeve which is a press-fit on a cylindrical seat 272 of the protuberance 20.

The radially innermost part of the annular main section 254a of the friction ring 254 bears against a ring-shaped bead 273 on the radially extending portion of an insert 221a constituting a retainer for the friction ring 254. The axially extending cylindrical portion 274 of the retainer 221a is corrugated and abuts the inner race 19 of the radial antifriction bearing between the components 3 and 4 (the component 4 is not shown in FIG. 8). The insert or retainer 221a has an L-shaped cross-sectional outline and its cylindrical portion 274 is a press-fit on the adjacent portion 275 of the periphery of the protuberance 20. The junction between the radially and axially extending portions of the insert 221a abuts against a shoulder of the protuberance 20.

If the washer 270 is omitted, the friction ring (diaphragm spring) 254 bears directly against the flange 39 of the component 3.

Figure 10:
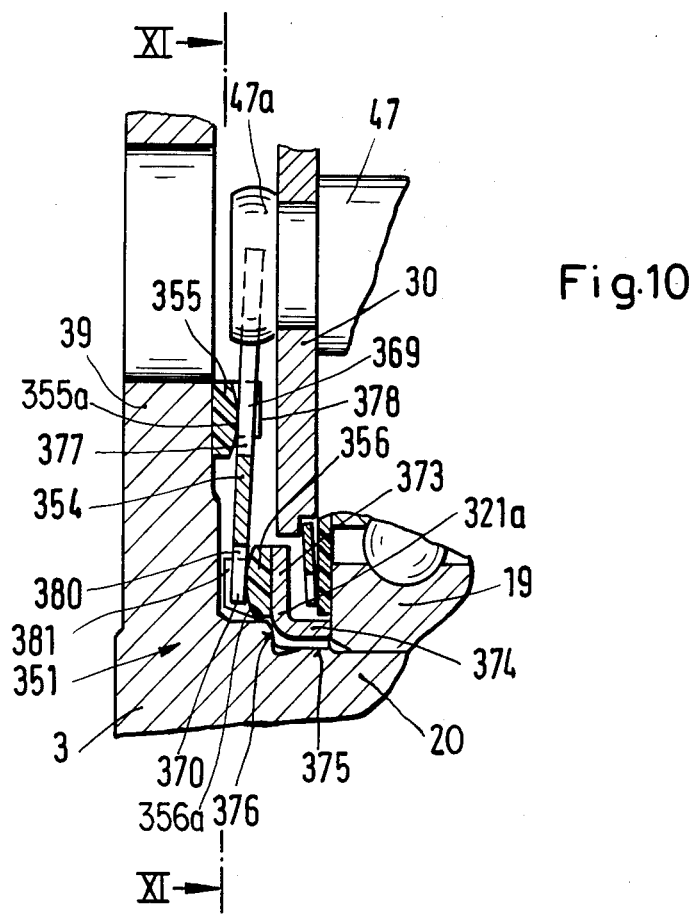
FIG. 10 is a view similar to that of FIG. 3 but showing a portion of a fourth friction generating device.
Figure 11:
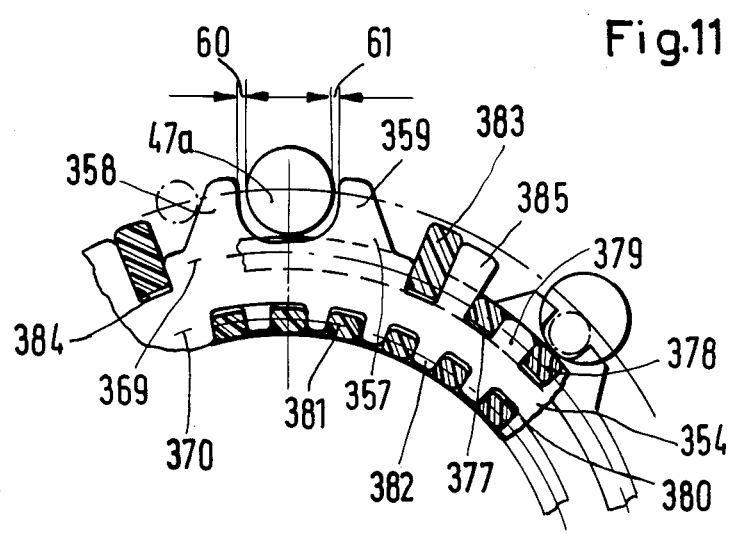
FIG. 11 is a smaller-scale partly elevational and partly sectional view, substantially as seen in the direction of arrows from the line XI—XI of FIG. 10.

FIGS. 10 and 11 show a further friction generating device 351 having a prestressed diaphragm spring 354 whose radially outermost portion 369 bears against a friction ring 355 so that the friction ring is urged against the adjacent side of the flange 39. The radially innermost portion of the diaphragm spring 354 bears against a second friction ring 356 so that the latter is urged against the radially extending portion 373 of an annular insert 321a. The axially extending portion 374 of the insert 321a abuts the inner race 19 of the antifriction bearing between the component 3 and the other component (not shown in FIGS. 10 and 11). The insert 321a has a substantially L-shaped cross-sectional outline and its sleeve-like axially extending portion 374 has an undulate outline. This portion 374 is a press-fit on the adjacent portion 375 of the periphery of the protuberance 20. The insert 321a further abuts a shoulder 376 of the protuberance 20 radially inwardly of the inner friction ring 356 and adjacent to one axial end of the portion 375.

The radially outermost portion 369 of the diaphragm spring 354 has one or more parts 357 provided with pairs of abutments or prongs 358, 359 receiving abutments 47a with a clearance 60+61. The abutments 47a constitute portions of the rivets 47 which secure the disc 30 to the component 4. The parts 357 of the portion 369 of the diaphragm spring 354 alternate with tooth spaces or recesses 377 which are bounded by surfaces serving to prevent rotation of the friction ring 355 relative to the flange 39. To this end, the friction ring 355 is provided with torque-transmitting projections in the form of teeth 378 which extend axially away from the flange 39 and into the tooth spaces 377 of the diaphragm spring 354. The tooth spaces 377 confine tongues or teeth 379 each of which is integral with the spring 354 and is flanked by two projections 378.

The radially innermost portion 370 of the diaphragm spring 354 has recesses or tooth spaces 380 for axially extending torque-transmitting projections or teeth 381 of the friction ring 356. This ensures that the ring 356 cannot rotate with reference to the spring 354. Each recess 380 confines a radially inwardly extending tongue or tooth 382 which is integral with the spring 354 and is flanked by two teeth 381.

FIG. 10 shows that the friction rings 355, 356 have annuli of convex (partly spherical) surfaces 355a, 356a which abut the respective sides of the diaphragm spring 354. The inner diameter of the friction ring 355 is greater than the outer diameter of the friction ring 356.

The friction ring 355 is further formed with radially outwardly extending projections in the form of fingers 383 which serve to center the friction ring 355 with reference to the diaphragm spring 354 during assembly of the friction generating device 351. The fingers 383 extend axially into recesses or sockets 384 of the spring 354. Still further, the spring 354 is provided with radially outwardly extending projections or teeth 385 each of which is adjacent to one flank of a discrete finger 383 (see FIG. 11) to facilitate assembly of the device 351. The teeth 385 center the friction ring 355 relative to the spring 354 when the elements which are shown in FIGS. 10 and 11 are assembled to form the friction generating device 351. The teeth 385 are longer than the teeth 379 (as considered in the radial direction of the diaphragm spring 354).

The structure which is shown in FIGS. 10 and 11 exhibits the advantage that it simplifies the assembly of the diaphragm spring 354 (whose conicity is quite pronounced prior to stressing) with other elements of the friction generating device 351, particularly with the friction rings 355 and 356.

Figure 12:
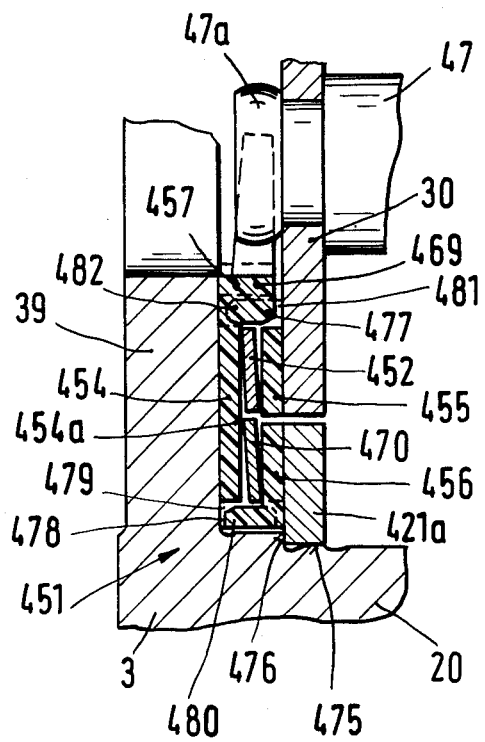
FIG. 12 is a view similar to that of FIG. 3 but showing a portion of a fifth friction generating device.
Figure 13:
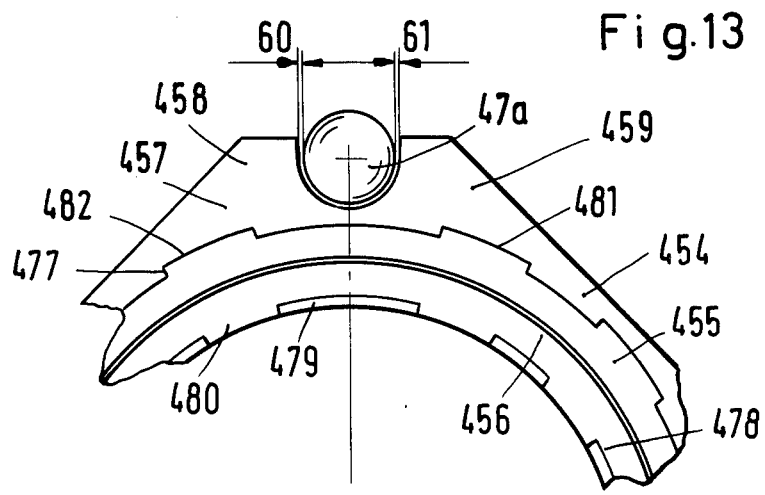
FIG. 13 is a smaller-scale elevational view of certain details as seen from the left-hand side of FIG. 12.

The apparatus of FIGS. 12 and 13 comprises a friction generating device 451 having a friction ring 454 including an annular section 454a which abuts directly against the flange 39 of the component 3. The section 454a includes an axially extending sleeve-like radially outermost portion 469 which extends in a direction away from the flange 39. The portion 469 spacedly surrounds a first diaphragm spring 452 which reacts against a washer 455 and bears against the annular section 454a. The washer 455 abuts the disc 30 which is secured to the component 4 by several rivets 47. A second diaphragm spring 470 is disposed radially inwardly of the diaphragm spring 452 to react against a washer 456 and to bear against the annular section 454a of the friction ring 454. The washer 456 abuts an annular insert 421a which is a press-fit on the portion 475 of the protuberance 20 and abuts a shoulder 476 of the part 20. The disc 30 surrounds the insert 421a.

The friction ring 454 further comprises a radially outwardly extending annular portion 457 with pairs of abutments or prongs 458, 459 flanking the respective abutments 47a with a clearance 60+61 which is shown in FIG. 13. The radially outermost portions of the diaphragm springs 452 and 470 bear against the annular section 454a of the friction ring 454, and the radially innermost portions of such diaphragm springs react against the respective washers 455, 456.

The means 478 for holding the friction ring 454 against rotation relative to the washer 456 comprises projections or teeth 479 which are provided on the radially innermost portion of the section 454a and extend axially away from the flange 39 of the component 3 and into tooth spaces between axially extending projections or teeth 480 along the innermost portion of the washer 456. The means 477 for holding the friction ring 454 against rotation relative to the washer 455 comprises axially extending projections or teeth 481 provided at the periphery of the washer 455 and received in complementary sockets 482 provided in the radially innermost part of the annular section 454a.

The materials and the mounting of the friction ring 454, diaphragm springs 452, 470 and washers 455, 456 are such that the combined moment of friction between the friction ring 454 and flange 39 as well as between the washer 456 and the insert 421a is greater than the total moment of friction between the washer 455 and the disc 30. This ensures that, when the prongs 458, 459 do not abut the portion 47a of the rivet 47, friction exists only between the washer 455 and the disc 30 and a more pronounced frictional damping action develops only after the portion 47a of the rivet 47 is contacted by the prong 458 or 459.

Figure 14:
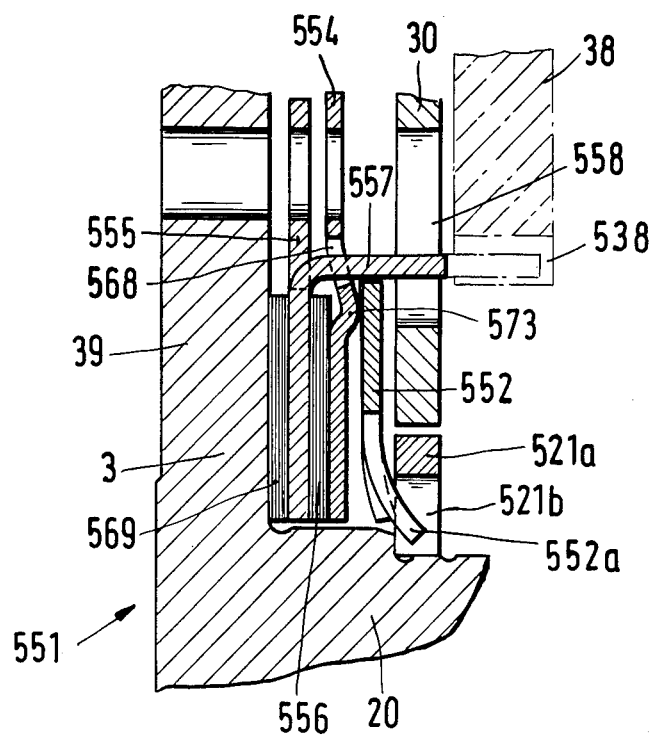
FIG. 14 is a sectional view similar to that of FIG. 3 but showing a sixth friction generating device, a portion of a modification being indicated by phantom lines.

Referring to FIG. 14, there is shown a friction generating device 551 which surrounds the protuberance 20 of the component 3. The device 551 comprises a diaphragm spring 552 having a radially innermost portion which engages an annular insert 521a having an undulate shape and being a press-fit on the adjacent portion of the periphery of the protuberance 20. The radially outermost portion of the diaphragm spring 552 abuts directly against a ring-shaped rib 573 on a first friction ring 554. The radially innermost portion of the diaphragm spring 552 comprises arms or prongs 552a which extend into recesses or tooth spaces 521b of the insert 521a to thus ensure that the diaphragm spring and the insert cannot rotate with reference to each other.

A second friction ring 555 is disposed between the flange 39 and the first friction ring 554. A first washer 556 is inserted between the friction rings 554, 555 and a second washer 569 is installed between the friction ring 555 and the flange 39. The bias of the diaphragm spring 552 upon the first friction ring 554 entails that the ring 554 urges the washer 556 against the friction ring 555 and that the ring 555 urges the washer 569 against the flange 39.

The friction ring 555 comprises axially extending arms 557 which serve to transmit torque to the friction ring 554. The arms 557 are disposed radially outwardly of the washers 556, 569 and are received in the openings 568 of the friction ring 554 with a certain play so that the friction rings 554, 555 have freedom of limited angular movement relative to each other. The arms 557 further extend into recesses 558 which are provided in the disc 30. The latter constitutes one of the abutment means and cooperates with the other abutment means (arms 557) to determine the clearance between the friction ring 555 and the second component (which is rigidly connected with the disc 30).

The friction generating device 551 is designed in such a way that the moment of friction which can be generated between the washer 556 and the friction ring 554 or between the washer 556 and the friction ring 555 is smaller than the moment of friction between the diaphragm spring 552 and the friction ring 554. This ensures that pronounced friction between the friction ring 554 and the diaphragm spring 552 becomes effective only when the arms 557 abut the surfaces bounding the respective recesses 558 of the disc 30. When the arms 557 are out of contact with the surfaces surrounding the corresponding recesses 558, the device 551 can generate only a less pronounced friction between the washer 556 and one of the friction rings 554, 555.

When the components 3 and 4 are caused to turn relative to each other, the friction ring 555 furnishes a frictional damping action only when the arms 557 abut the surfaces surrounding the respective recesses 558 of the disc 30 which is rigid with the component 4. When the friction ring 555 is about to be rotated by the disc 30 through the medium of the arms 557, the washers 556, 569 provide a frictional damping action before the surfaces surrounding the recesses 558 strike against the respective arms 557. When the arms 557 begin to rotate with the disc 30, the friction ring 554 is turned with reference to the component 3 so that friction which is generated by the washer 556 becomes ineffective and is replaced by friction which is generated between the rib 573 of the friction ring 554 and the diaphragm spring 552. The just described mode of operation amounts to a stepwise intensification of the frictional damping action as the extent of angular displacement of the component 3 or 4 relative to the component 4 or 3 increases.

In accordance with a modification, the arms 557 extend directly into recesses 538 of the flange 38 (indicated in FIG. 14 by phantom lines). The clearance between the surfaces surrounding the recesses 538 and the respective arms 557 can be the same as that between the arms 557 and the surfaces surrounding the recesses 558 of the disc 30. It is preferred to enlarge the recesses 558 in the circumferential direction of the protuberance 20 so that the arms 557 can abut the flange 38 but not the disc 30. The just described modification is often desirable and advantageous because it allows for a smoother start of operation of the friction generating device 551 since the friction ring 555, and hence also the friction ring 554, is connected in series with the coil springs 45 (not shown in FIG. 14) installed between the flange 38 and the component 3 which latter carries the friction generating device 551.

The mode of operation of the apparatus 1 of FIGS. 1 to 4 will be explained in greater detail with reference to the torsion diagram of FIG. 15. The angular displacement of the components 3, 4 relative to each other is measured along the abscissa and the torque which is transmitted from one of these components to the other component is measured along the ordinate. The arrow 70 indicates the direction in which the crankshaft 5 of the engine drives the component 3 and the input element 10 of the change-speed transmission (via component 4 and friction clutch 7). The arrow 71 indicates the direction in which the input element 10 of the transmission can drive the component 3 by way of the friction clutch 7 and component 4 when the vehicle is coasting.

The characteristic torsion curve of the inner damping unit 13 is shown at 72. This curve also denotes the hysteresis which is generated as a result of frictional engagement of the radially innermost parts of radially extending portions 25b, 26 with the respective end faces of the inner race 19 of the bearing 16. The characteristic curve 74 of the outer damping unit 14 (shown by phantom lines) denotes the hysteresis which develops as a result of frictional engagement of the linings 41 on the flange 38 with the discs 34, 35. The curve 74 denotes the hysteresis which is generated by the device 51; such hysteresis develops while the components 3, 4 turn relative to each other through the entire angle 65+66. As can be readily seen, the outer damping unit 14 offers a greater resistance to rotation of the components 3, 4 relative to each other than the inner damping unit 13.

Starting from the idle positions of the damping units 13, 14 and assuming that the abutment 47a is located midway between the prongs 58, 59 (as shown in FIG. 4), and assuming further that the component 3 begins to turn relative to the component 4 in the direction of the arrow 70, such angular movement is opposed by the coil springs 50 and by friction between the portions 25b, 26b and the inner race 19 while the component 3 turns through an angle (A) corresponding to the clearance 60. The prong 58 of FIG. 4 then contacts the abutment 47a and the friction ring 54 is caused to turn with reference to the component 3 which increases the resistance to rotation of the component 3 relative to the component 4 due to friction (75) which is generated by the device 51. In response to further angular movement of the components 3, 4 relative to each other in the direction of arrow 70, the coil springs 50 of the inner damping unit 13 store additional energy until the torque which is transmitted by the springs 50 overcomes the moment of friction which is generated by the linings 41. This takes place when the component 3 covers the angle B. If the angular displacement of the component 3 relative to the component 4 continues, the coil springs 45 (which are in series with the coil springs 50) begin to store energy and the linings 41 generate a moment of friction. Compression of the springs 50 continues until the rivet 47 of FIG. 2 reaches one of the adjacent teeth 64 on the flange 38 (this takes place when the component 3 covers the angle C). The inner damping unit 13 is then bypassed, i.e., the coil springs 50 do not undergo any further deformation. If the angle C is exceeded, the coil springs 45 of the outer damping unit 14 are caused to store additional energy until that time when the component 3 has completed its angular movement relative to the component 4 and cannot turn any more (angle D). The bias of the springs 45 is superimposed upon the moments of friction which are generated by the portions 25b, 26b, by the friction linings 41 and by the friction generating device 51 while the component 3 covers the angle E.

When the apparatus 1 is caused to resume its normal or idle condition, the coil springs 45 dissipate energy while the component 3 turns through the angle F. The coil springs 50 remain fully compressed, i.e., the teeth 64 of the flange 38 abut the respective rivets 47. As the component 3 continues to turn in the direction of the arrow 71, the coil springs 50 begin to dissipate energy and the coil springs 45 continue to dissipate energy. When the component 3 covers the angle G (in the direction of arrow 71), the abutment 47a of FIG. 4 reaches the prong 59 (such abutment was in the process of moving away from the prong 58 in response to a change in the direction of angular movement of the component 3 from that indicated by the arrow 70 to that indicated by the arrow 71) whereby the friction ring 54 (which was idle during rotation of the component 3 through the angle G) begins to turn relative to the component 3 which entails a change in the resistance to rotation to an extent corresponding to the moment of friction 75 of the friction generating device 51. The angle G corresponds to the combined clearance 60+61 between the abutment 47a and the prongs 58, 59 shown in FIG. 4.

If the component 3 is caused to leave its neutral position by turning in the direction of arrow 71 (note the right-hand part of the diagram of FIG. 15), the mode of operation of the damping units 13, 14 as well as of the friction generating parts 25b, 26b, 41 and 51 is analogous to that described above (when the component 3 turns in the direction of arrow 70). However, the angles which the component 3 covers while the damping units 13, 14 are effective can deviate from the angles which the component 3 covers in the direction of arrow 70.

The mode of operation of the friction generating devices 251, 351 and 451 is analogous to that of the device 51.

The friction generating devices 151 and 551 bring about a stepwise buildup of friction and frictional hysteresis (see the broken lines 76 in FIG. 15).

The improved apparatus is susceptible of many additional modifications without departing from the spirit of the invention. Thus, whereas the drawing shows that only the friction rings and certain other parts of the friction generating devices 251, 351 and 451 are made of a synthetic plastic material, it is equally possible to make the friction ring 54 of FIG. 3 from a synthetic plastic material. Moreover, the friction ring 54 can be integral with the washer 55 and/or 56. Still further, the radially outermost portions of the prongs 58, 59 can be integrally connected to each other so that the abutment 47a is received in a slot which extends in the circumferential direction of the friction ring 54.

The second angle (rotation of the components of the flywheel relative to each other while the friction generating device is inactive) can be readily selected in such a way that minor angular displacements of the components relative to each other are opposed primarily or exclusively by coil springs (and possibly by a single washer or ring which acts in parallel with the coil springs and generates relatively small amounts of friction), i.e., that the second component is not likely to transmit each and every minor angular displacement of the first component to the input element of the change-speed transmission. Such minor angular displacements of the first component can be caused by minor fluctuations and other irregularities of the moment which is transmitted by the engine of the motor vehicle, especially during idling but also under normal operating conditions under load. If the torque which is transmitted by the crankshaft of the engine fluctuates within a wider range, i.e., if the angular displacement of the first component relative to the second component of the flywheel exceeds a certain amplitude, such displacement goes beyond the aforementioned second angle (namely the angle of deactivation of the friction generating device) so that the friction generating device becomes active and damps the angular displacements of the components relative to each other. The thus developing pronounced frictional hysteresis entails a dissipation and absorption of surplus energy which is generated as a result of extensive angular displacement of the two components relative to each other. Extensive angular displacement of the first component relative to the second component or vice versa is likely to take place during starting and stopping of the engine, i.e., when the entire resonance range of the composite flywheel must be traversed, as well as in response to abrupt and pronounced fluctuations and other irregularities of the transmitted torque (e.g., during transition from traction to coasting or vice versa).

Another important advantage of the improved apparatus is that, for one or more selected angular displacements of the two components of the flywheel relative to each other, the magnitude of the moment in response to increasing angular displacement deviates from the magnitude of the moment in response to decreasing angular displacement. This is desirable for effective dissipation of energy and for filtering of oscillatory movements of the components relative to each other.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A torque compensating apparatus, particularly for counteracting abrupt changes of torque which is transmitted in a motor vehicle having an engine with an output element and a change-speed transmission with an input element, comprising a flywheel including a first rotary component which is arranged to receive torque from the output element of the engine and a second rotary component which is coaxial with the first component and is arranged to transmit torque to the input element of the transmission, one of said components having an axially extending protuberance and a radially extending flange, said components being rotatable relative to each other in clockwise and counterclockwise directions; damping means for yieldably opposing rotation of said components relative to each other, comprising at least one friction generating device on said one component and means for deactivating said device during rotation of said components relative to each other through a predetermined angle upon each reversal of the direction of rotation of one of said components with reference to the other of said components; and antifriction bearing means having an inner race on said protuberance, an outer race and an annulus of rolling elements between said races, said damping means being disposed between said inner race and said flange as considered in the axial direction of said components.

2. The apparatus of claim 1, wherein said components are rotatable relative to each other within a second angle and said device comprises a friction ring disposed between said components to yieldably oppose rotation of said components relative to each other within said second angle minus said predetermined angle, said deactivating means including means for shifting said predetermined angle relative to the boundaries of angular movability of said components within said second angle.

3. The apparatus of claim 2, wherein said damping means further comprises energy storing means which determine said boundaries.

4. The apparatus of claim 1, wherein said friction generating device includes a first abutment, said deactivating means being provided on the other of said components and including a second abutment, said abutments being movable relative to each other about the common axis of said components through said predetermined angle.

5. The apparatus of claim 1, wherein said damping means is flanked by said components, as considered in the direction of the common axis of said components.

6. The apparatus of claim 1, wherein said damping means is mounted on said first component.

7. The apparatus of claim 1, wherein said damping means is concentrically mounted on and surrounds said protuberance.

8. The apparatus of claim 1, wherein said protuberance is a centrally located axially extending stub-shaped protuberance and said damping means is mounted on said protuberance.

9. The apparatus of claim 8, wherein said protuberance is provided on said first component.

10. The apparatus of claim 1, wherein said antifriction bearing means is interposed between said components.

11. The apparatus of claim 1, wherein said device comprises at least one friction ring and means for biasing said ring axially toward said flange.

12. The apparatus of claim 11, wherein said biasing means comprises a diaphragm spring reacting against one of said races and bearing against said friction ring.

13. The apparatus of claim 12, wherein said device further comprises a distancing ring interposed between said one race and said diaphragm spring, said diaphragm spring having a radially innermost portion in contact with said distancing ring.

14. The apparatus of claim 12, wherein said device further comprises a washer between said diaphragm spring and said friction ring.

15. The apparatus of claim 14, wherein said device further comprises an intermediate washer between said first named washer and said diaphragm spring, said spring having a radially outermost portion bearing directly against said intermediate washer.

16. The apparatus of claim 11, wherein said device further comprises a washer interposed between said friction ring and said flange.

17. The apparatus of claim 1, wherein said device comprises a friction ring which is arranged to share the angular movements of one of said components and said deactivating means comprises two prongs provided on and extending radially of said ring and an abutment provided on the other of said components and disposed between said prongs with a clearance such that said ring and said abutment are free to move angularly relative to each other through said predetermined angle.

18. The apparatus of claim 17, wherein said abutment comprises a rivet having a portion between said prongs.

19. The apparatus of claim 18, wherein said components are rotatable relative to each other within a second angle and said damping means further comprises an input element provided on one of said components and an output element provided on the other of said components and movable with reference to said input element within said second angle, said rivet having means for fixing one of said elements to the respective component.

20. The apparatus of claim 1, wherein said device comprises a friction ring and means for biasing said ring toward one of said components, said deactivating means comprising an abutment provided on said ring and a slotted member provided on the other of said components and receiving said abutment with a clearance which enables said ring and said other component to turn relative to each other through said predetermined angle.

21. The apparatus of claim 20, wherein said abutment includes a lug which is integral with said ring and extends substantially axially of said components.

22. The apparatus of claim 20, wherein said one component includes a radially extending flange and said device further comprises a washer interposed between said flange and said ring, said washer being in frictional engagement with said ring.

23. The apparatus of claim 22, wherein said washer has first stop means and said one component has second stop means cooperating with said first stop means so as to enable said one component and said washer to perform limited angular movements relative to each other.

24. The apparatus of claim 23, wherein said first stop means comprises a substantially axially extending lug provided on said washer and said second stop means constitutes a portion of said flange, said portion having a recess into which said lug extends with a predetermined clearance in the circumferential direction of said washer.

25. The apparatus of claim 23, wherein said predetermined angle deviates from the angle through which said first and second stop means are movable relative to each other.

26. The apparatus of claim 25, wherein said predetermined angle exceeds the angle through which said stop means are movable relative to each other.

27. The apparatus of claim 22, wherein said device further comprises an intermediate washer between said first named washer and said flange.

28. The apparatus of claim 27, wherein said washers are in direct frictional engagement with each other.

29. The apparatus of claim 27, wherein said washers are arranged to transmit to each other a first moment of friction and said ring and said first named washer are arranged to transmit to each other a lesser second moment of friction.

30. The apparatus of claim 29, wherein said intermediate washer and said flange are arranged to transmit to each other a third moment of friction not exceeding said first moment of friction.

31. The apparatus of claim 22, wherein at least one of the parts including said ring and said washer has at least one rib in direct frictional engagement with the other of said parts.

32. The apparatus of claim 1, wherein said device comprises a prestressed diaphragm spring.

33. The apparatus of claim 32, wherein one of said components includes a radially extending flange and an axially extending protuberance, said device further comprising a ring-shaped retainer on said protuberance, said diaphragm spring having a first annular portion reacting against said retainer and a second annular portion bearing against said flange.

34. The apparatus of claim 33, wherein said retainer has a substantially L-shaped cross-sectional outline and further comprising antifriction bearing means interposed between said components and having two races and antifriction rolling elements between said races, said retainer including an axially extending portion abutting one of said races as considered in the axial direction of said components.

35. The apparatus of claim 34, wherein said retainer further comprises a radially extending portion having a bead abutting said diaphragm spring.

36. The apparatus of claim 33, further comprising means for non-rotatably connecting said retainer to one of said components.

37. The apparatus of claim 32, wherein said device further comprises a washer between said diaphragm spring and one of said components.

38. The apparatus of claim 37, wherein said washer is non-rotatably secured to said one component.

39. The apparatus of claim 37, wherein said one component has an annular seat and said washer includes a sleeve-like portion which is a press-fit on said seat.

40. The apparatus of claim 32, wherein said diaphragm spring is mounted on one of said components and said deactivating means comprises first abutment means on said diaphragm spring and second abutment means provided on the other of said components and cooperating with said first abutment means to limit the angular movability of said first and second abutment means relative to each other to said predetermined angle.

41. The apparatus of claim 40, wherein said first abutment means includes two substantially radially extending prongs on said diaphragm spring and said second abutment means comprises an axially extending projection provided on said other component and received between said prongs with a clearance which enables said spring and said other component to turn relative to each other through said predetermined angle.

42. The apparatus of claim 40, wherein said second abutment means comprises a rivet which is rigid with said other component.

43. The apparatus of claim 40, wherein said components are rotatable relative to each other within a second angle and said damping means further comprises an input element provided on said one component and an output element provided on said other component and movable with reference to said input element within said second angle, said rivet having means for affixing said output element to said second component.

44. The apparatus of claim 1, wherein said device comprises a prestressed diaphragm spring and two friction rings flanking said spring, said spring having a first annular portion in contact with one of said rings and a larger-diameter second annular portion in contact with the other of said rings.

45. The apparatus of claim 44, wherein said friction rings and said spring have torque transmitting portions which compel said rings to share all angular movements of said spring and vice versa.

46. The apparatus of claim 45, wherein the torque transmitting portions include substantially axially extending projections on said rings and the torque transmitting portions of said spring include teeth mating with said projections.

47. The apparatus of claim 46, wherein said teeth include a first annulus mating with the projections of one of said rings and a larger-diameter second annulus mating with the projections of the other of said rings.

48. The apparatus of claim 46, wherein said spring has tooth spaces alternating with said teeth and being open in the radial direction of said spring.

49. The apparatus of claim 44, wherein one of said components has a radially extending flange and one of said rings is disposed between said flange and said spring, and further comprising an antifriction bearing between said components, the other of said rings being disposed between said spring and said bearing.

50. The apparatus of claim 44, wherein one of said components comprises a radial flange and one of said rings bears directly against said flange.

51. The apparatus of claim 44, further comprising antifriction bearing means installed between said components and having first and second races and an annulus of antifriction rolling elements between said races, and an annular insert between one of said races and the other of said rings, one of said components having an axially extending protuberance which is surrounded by said races and said insert.

52. The apparatus of claim 51, wherein said other ring has an annulus of axially extending projections and said spring has an annulus of substantially radially inwardly extending teeth mating with said projections.

53. The apparatus of claim 44, wherein one of said components has a radial flange and one of said rings is adjacent said flange, said one ring having an annulus of substantially axially extending projections and said spring having an annulus of radially outwardly extending teeth mating with said projections.

54. The apparatus of claim 44, wherein each of said rings has an annulus of convex surfaces in contact with said diaphragm spring.

55. The apparatus of claim 44, wherein said deactivating means comprises first abutment means provided on said spring and second abutment means provided on one of said components, said second abutment means cooperating with said first abutment means to permit said spring and said one component to move relative to each other through said predetermined angle.

56. The apparatus of claim 55, wherein said first abutment means comprises two circumferentially spaced-apart prongs on said spring and said second abutment means comprises an axial projection provided on said one component and received with clearance between said prongs.

57. The apparatus of claim 55, wherein said second abutment means comprises a rivet.

58. The apparatus of claim 55, wherein said components are rotatable relative to each other through a second angle and said damping means further comprises an input element provided on the other of said components and an output element, said second abutment means comprising a rivet securing said output element to said one component, said elements having freedom of angular movement relative to each other through said second angle.

59. The apparatus of claim 44, wherein the inner diameter of one of said rings exceeds the outer diameter of the other of said rings.

60. The apparatus of claim 44, wherein one of said components has a radial flange and one of said rings is adjacent to said flange and includes a plurality of radially outwardly extending fingers.

61. The apparatus of claim 60, wherein said spring has substantially radial slots for at least some of said fingers.

62. The apparatus of claim 61, wherein said spring has pairs of teeth flanking said slots, each of said pairs having a shorter tooth and a longer tooth.

63. The apparatus of claim 1, wherein one of said components has a radial flange and said device comprises a friction ring having an inner annular portion immediately adjacent said flange and an outer annular portion, said deactivating means comprising first abutment means on said outer annular portion and second abutment means provided on the other of said components and movable relative to said first abutment means within said predetermined angle.

64. The apparatus of claim 63, wherein said first abutment means comprises two prongs extending radially outwardly of said ring, said second abutment means comprising an axial projection provided on said other component and received between said prongs with limited freedom of angular movement.

65. The apparatus of claim 63, wherein said projection is a rivet.

66. The apparatus of claim 63, wherein said components are rotatable relative to each other through a second angle and said damping means further comprises an input element provided on said one component and an output element provided on said other component and cooperating with said input element to limit the angular movements of said components relative to each other to said second angle, said second abutment means comprising a rivet which secures said output element to said other component.

67. The apparatus of claim 63, wherein said outer annular portion comprises an axially extending radially outermost section.

68. The apparatus of claim 67, wherein said device further comprises a friction washer and a diaphragm spring within said radially outermost section.

69. The apparatus of claim 68, wherein said spring is installed in prestressed condition between said inner radial portion and said washer.

70. The apparatus of claim 69, wherein said other component comprises an annular portion which abuts said washer.

71. The apparatus of claim 70, wherein said components are rotatable relative to each other through a second angle and said damping means further comprises an input element on said one component and an output element on said other component, said elements being mo-able relative to each other within said second angle and said output element including said annular portion of said other components.

72. The apparatus of claim 68, wherein said device further comprises a second friction washer and a second diaphragm spring surrounded by said first named washer and said first named spring, said second spring being disposed between said inner annular portion and said second washer.

73. The apparatus of claim 72, wherein said device further comprises an annular insert which is arranged to share all angular movements of said one component and abuts axially against said second washer, said ring being mounted on said one component.

74. The apparatus of claim 72, wherein said second washer has a substantially L-shaped cross-sectional outline.

75. The apparatus of claim 1, wherein said device comprises at least two friction rings, one of said rings having means for transmitting torque to the other of said rings.

76. The apparatus of claim 75, wherein said rings are mounted on one of said components and said deactivating means comprises first abutment means provided on said one ring and second abutment means provided on the other of said components and cooperating with said first abutment means to limit the angular movements of said one ring relative to said other component to said predetermined angle.

77. The apparatus of claim 76, wherein said first abutment means includes said torque transmitting means.

78. The apparatus of claim 77, wherein said first abutment means comprises an axially extending arm on said one ring and said second abutment means has a recess wherein said arm is movable within said predetermined angle.

79. The apparatus of claim 75, wherein said other ring has an opening for said torque transmitting means.

80. The apparatus of claim 79, wherein said torque transmitting means is received in said opening with limited first freedom of movement about the common axis of said components.

81. The apparatus of claim 80, wherein said rings are mounted on one of said components and said deactivating means comprises a portion of the other of said components, said portion having a recess into which said torque transmitting means extends with greater second freedom of movement about the common axis of said components.

* * * * *